United States Patent
Feigenbaum et al.

(10) Patent No.: US 7,987,509 B2
(45) Date of Patent: Jul. 26, 2011

(54) GENERATION OF UNIQUE SIGNIFICANT KEY FROM URL GET/POST CONTENT

(75) Inventors: Lee Feigenbaum, Brookline, MA (US); Sean J. Martin, Webster, MA (US); Simon L. Martin, Hursley (GB); Elias Torres, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 1405 days.

(21) Appl. No.: 11/272,338

(22) Filed: Nov. 10, 2005

(65) Prior Publication Data

US 2007/0104326 A1 May 10, 2007

(51) Int. Cl.
*G06F 17/30* (2006.01)

(52) U.S. Cl. ............... 726/26; 726/28; 726/29; 726/30; 713/151; 713/152

(58) Field of Classification Search .................... 380/44; 713/189; 726/2, 22
See application file for complete search history.

(56) References Cited

U.S. PATENT DOCUMENTS

| | | | | |
|---|---|---|---|---|
| 6,094,649 | A | 7/2000 | Bowen et al. ............ | 707/3 |
| 6,185,701 | B1 | 2/2001 | Marullo et al. ............ | 714/38 |
| 6,393,422 | B1 | 5/2002 | Wone ...................... | 707/10 |
| 6,516,312 | B1 | 2/2003 | Kraft et al. ............... | 707/3 |
| 6,532,481 | B1 | 3/2003 | Fassett, Jr. ............... | 707/203 |
| 6,621,823 | B1 | 9/2003 | Mellquist et al. ......... | 370/401 |
| 6,678,828 | B1 * | 1/2004 | Pham et al. .............. | 726/2 |
| 6,931,532 | B1 * | 8/2005 | Davis et al. .............. | 713/167 |
| 6,941,459 | B1 * | 9/2005 | Hind et al. ............... | 713/167 |
| 6,961,849 | B1 * | 11/2005 | Davis et al. .............. | 713/167 |
| 6,978,367 | B1 * | 12/2005 | Hind et al. ............... | 713/167 |
| 7,181,017 | B1 * | 2/2007 | Nagel et al. .............. | 380/282 |
| 7,237,030 | B2 * | 6/2007 | Chakraborty et al. ..... | 709/229 |
| 7,477,626 | B2 * | 1/2009 | Chen et al. ............... | 370/331 |
| 7,660,844 | B2 * | 2/2010 | Takase et al. ............ | 709/203 |
| 2004/0107177 | A1 | 6/2004 | Covill et al. ............. | 707/1 |
| 2004/0158617 | A1 | 8/2004 | Shanny et al. .......... | 709/217 |

FOREIGN PATENT DOCUMENTS

CA 2 390 348 6/2002

OTHER PUBLICATIONS

"Virtual URLs for Browsing and Searching Large Information Spaces", Research Disclosure, Sep. 1998, pp. 1238-1239.
"Personal Web Space", Y. Chen et al., Distributed Computing Systems Workshops, 2002. Jul. 2002, pp. 169-175.
"Simplified Order processing With Apache's mod_qs2ssi", Mitch Wyle, http://www.webtechniques.com/archives/2000/01/junk/, pp. 1-5.
"Modeling Interactive Web Sources for Information Mediation", B. Ludascher et al. ER'99 Workshop on Evolution and Change in Data Management, Reverse Engineering in Information Systems, and the World Wide Web and Conceptual Modeling, pp. 225-238.

* cited by examiner

*Primary Examiner* — Pramila Parthasarathy
(74) *Attorney, Agent, or Firm* — John E. Campbell

(57) ABSTRACT

Generating a unique URL key for a web document according to an obtained key generating policy. The URL of a web page is parsed according to the policy in order to generate the URL key. Preferably, the key generating policy is obtained from a well known source associated with the web page.

18 Claims, 12 Drawing Sheets

GENERATION OF UNIQUE SIGNIFICANT KEY FROM URL GET/POST CONTENT

FIELD OF THE INVENTION

The present invention relates to the field of World Wide Web computer systems, more particularly to generating unique keys from a URL.

BACKGROUND OF THE INVENTION

There are two classes of applications that require keys to identify specific World Wide Web resources. First, some applications need to store a key for a particular web page that will allow the application to find that exact page at some point in the future. The second class of applications need to associate a key with a particular web page locally, in order that the same key can find the saved content at a future time. An example of the first class of applications is a web annotation system which needs to be able to generate a key to associate an annotation with the proper web resource being annotated. An example of the second class of application is a web proxy server, which needs to be able to generate a key from a web page as it stores the web page locally, and then generate the same key on subsequent requests for that resource in order to properly return the cached resource.

The natural solution to this problem is to use the URL of the web page as the key for that web page. URLs are strings divided into four components (<scheme>://<authority><path>?<query>), such as:

EXAMPLE 1

HTTP://example.com/path/to/documents/index.htm?print=true&session=123

In the URL in Example 1, "http" is the scheme, "example.com" is the authority, "/path/to/documents" is the path, and "print=true&session=123" is the query component of the URL. In many cases, using the URL of a web page as the page's key works adequately. However, there are two ways in which this simple URL-as-key scheme can fail, and each failure method causes deficiencies for one of the two classes of applications described above.

First, web applications that make use of the query component of a URL ignore the order of the parameters that comprise the query. That is, most applications will return the same web page regardless of whether "print=true" or "session=123" comes first in the query part of the URL. Furthermore, the query part of a URL often contains optional parameters; that is, parameters whose omission does not change the web resource that the application returns. Because of these two factors, every web page generated by this sort of web application can be represented by many different URLS. If one of these URLs is used as the key to a web page in the second application type (proxy-type applications), then the lack of a unique key means that the same web page will end up being cached repeatedly, and the efficiency of the applications local content store will be greatly reduced.

The second reason that URLs are insufficient is that a URL is not the sole determiner of the web page that is returned by a web server. For example, there are two common methods of requesting web resources via the hypertext transfer protocol (HTTP), GET and POST. The two are almost identical, except that in (most) POST requests, the query component of the URL is not included but is instead included as data transferred to the web application server. Because the web application can act on this data that is not included in the URL, the same URL can point to many different web resources. Similarly, HTTP allows small amounts of data or "cookies" to be transmitted to a particular web server with every request for a web page. These cookies can affect the contents of the returned web resource, and as such also cause a single URL to map to multiple web resources. Both of these may lead one URL to map to many resources and therefore cause a problem for the first class of applications (e.g. annotation applications) presented above. Storing a URL that does not uniquely identify a single resource prevents the application from finding the appropriate resource in the future.

These two major issues with URLs as keys for web resources make it very difficult for applications to either guarantee that the same resource will always be retrieved when using the same URL string or to reduce the number of copies the application stores of different URLs pointing to the same resource.

U.S. Pat. No. 6,532,481 "Product identifier, catalog and locator system and method" filed Mar. 31, 2000 and incorporated herein by reference provides a key code generating engine that strips extenders and other unwanted characters from a file or product name, truncates the remainder to a set maximum, appends the result to an identifier and provides a version suffix. The key code then is associated with other information about the file or product, such as a description, version, size, and a location identifier such as an address, telephone number or Internet web site URL. The resulting record is collated into a plurality of databases accessible through the Internet and searchable by key code or Boolean keyword strings to locate files for downloading or vendors' web pages for ordering or learning more about a product. Multiple database systems segregated by subject matter can provide users a virtual card catalog of products and their respective upgrades, patches and add-ons. The key code, when applied to physical products instead of files, also can provide means for researching availability and ordering such physical products and accessories through alternative supplier inventory schemes. The patent does not deal with World Wide Web pages or URLs.

US Patent Application No. 20040107177A1 "Automated content filter and URL translation for dynamically generated web documents" filed Jun. 12, 2003 and incorporated herein by reference provides a method, process and apparatus for filtering a request from a client and building the response to that request using mapping tables. These mapping tables are utilized to present content-related information about hypertext documents that can be dynamically generated from a database, on one or more servers. The dynamically generated hypertext documents may be web pages for the World Wide Web portion of the Internet. The mapping table is used to automatically generate a mapping page to best match its intended viewer's request. A mapping page designed to be viewed by a computer system will be presented in a format optimized for use by a web crawler program to build an index of web pages that may be generated at the server site. A mapping page designed to be viewed by a person will be presented in a human readable format, with optimizations made based on how that user arrived at the page. A site operator will enter the basic information required to generate the first mapping table entries, including information required to build a data access algorithm. Data used in these mapping tables, including the URL (uniform resource locator), keyword data and content, is fetched by an automated web browser (spider) through the HTTP (hyper text transport protocol) transport using the data access algorithm generated. Site operators may specify initial logical data groupings. Mapping table entries may be continuously updated, and subsequent entries may be automatically generated based on the criteria that was used in the requesting query. Individual table entries may be influenced by a predetermined algorithm as designated by the industry that the site operator has selected. It does not deal with arbitrary URLs.

A method is needed to provide keys that are unique to a resource.

SUMMARY OF THE INVENTION

This invention consists of a collection of canonicalization methods and a profile-based algorithm that, together, overcome the two deficiencies presented above in using a URL as a key for a web resource. A unique key is made from a complete HTTP request via a sequence of steps encapsulated within a well-known public profile for the web site from which the page in question is served. The steps can include reordering of URL query parts, omission of URL query parts, additions of unspecified query parts, inclusion of POST data, inclusion of cookie data, and inclusion of user-supplied data. These generated keys are necessary to identify the web page as a match with a previously requested remote resource and to be enough information to drive an application to the same web location or application context in order to give a user the same context that was seen when a particular context was first requested. The same technique is applicable to a Universal Resource Identifier (URI) as well as the URL.

It is therefore an object of the invention to generate a unique internet uniform resource key from a URL (or URI) by receiving a first request for a web document, the first request comprising a first uniform resource address (URA), the first URA consisting of any one of a uniform resource indentifier (URI) or a uniform resource locator (URL). Then, obtaining a key generating policy and generating a first unique URA key based on the key generating policy and the first URA.

It is a further object of the invention wherein the key generating policy comprises any one of the further steps consisting of: including information, excluding the information or transforming the information wherein the information comprises any one of the URA, HTTP request headers, or HTTP request data.

It is yet another object of the invention to perform a transforming the information step comprising any one of the further steps consisting of looking-up a DNS CNAME, reordering query parameters, removing one or more query parameters, including HTTP headers, adding additional query parameters, including POST request data, including http basic authentication information, or prompting a user for the additional information.

It is still a further object of the invention to perform the further steps of retrieving components of a page associated with the first URA, associating the generated first URA key with the retrieved components, saving the retrieved components and associated generated URA key in a cache.

It is yet another object of the invention to perform the further steps of receiving a first request for the web document and retrieving the saved retrieved components and associated generated URA from the cache.

It is still another object of the invention to perform the further step of associating the first unique URA key with external data.

It is still another object of the invention to perform the further steps of receiving a request to provide the web document and using the first unique URA to obtain the external data to provide a version of the web document as it existed when the first unique URA key was associated.

It is still another object of the invention to provide a policy that is any one of a policy related to the first URA, a policy related to a user, a policy provided by a web service, a policy independent of the first URA, or a policy independent of any URA.

It is still another object of the invention to obtain the key generating policy by any one of receiving the policy from an application program, fetching the policy from a well-known public policy repository, fetching the policy from a queryable server, fetching the policy from a well-known location relative to the host machine hosting the web document being served or fetching the policy from a well-known location relative to the root of the host machine hosting the web document being served.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF PREFERRED EMBODIMENTS

Figure 1:
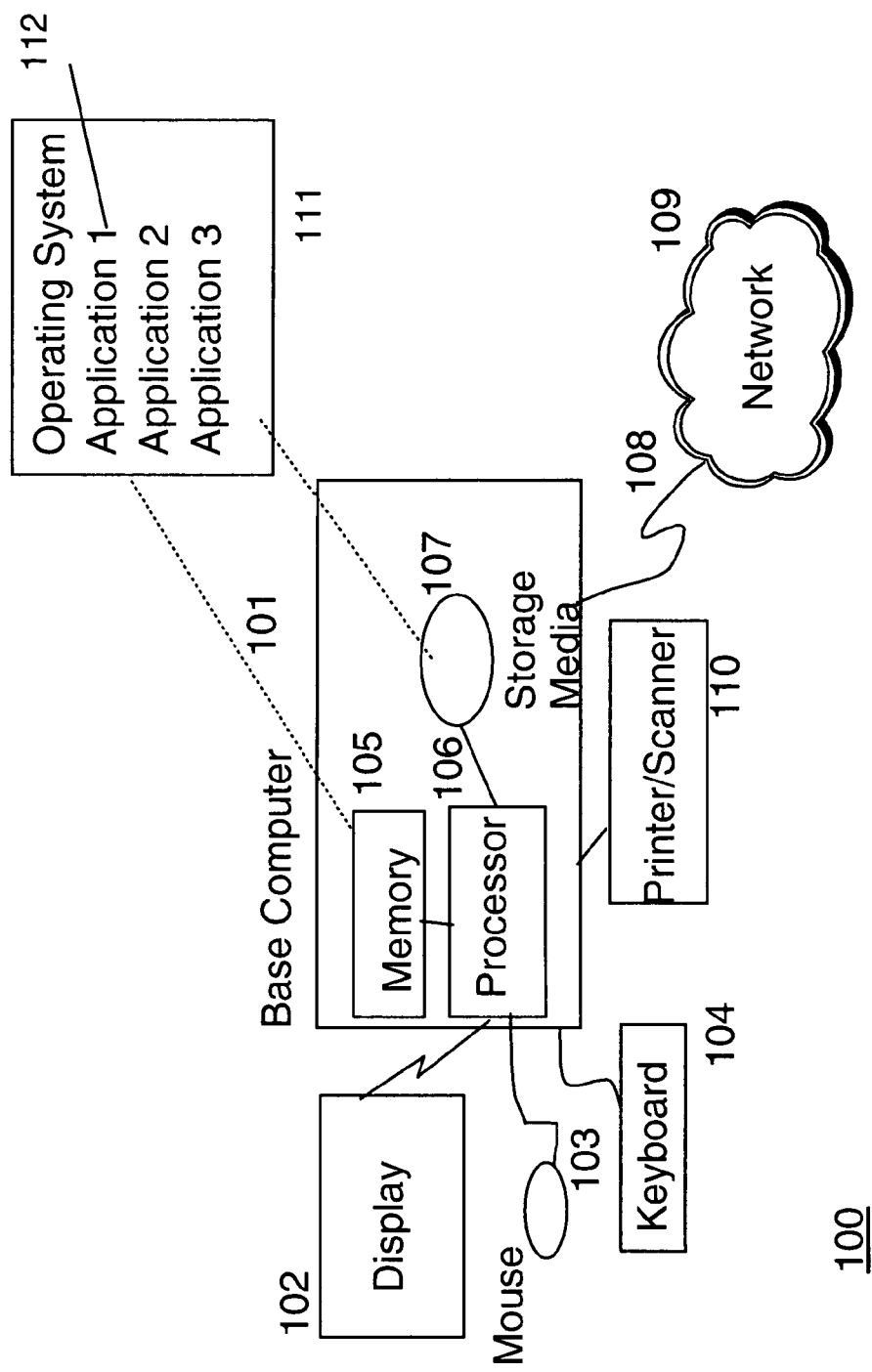
FIG. 1 is a diagram depicting components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating 108 with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
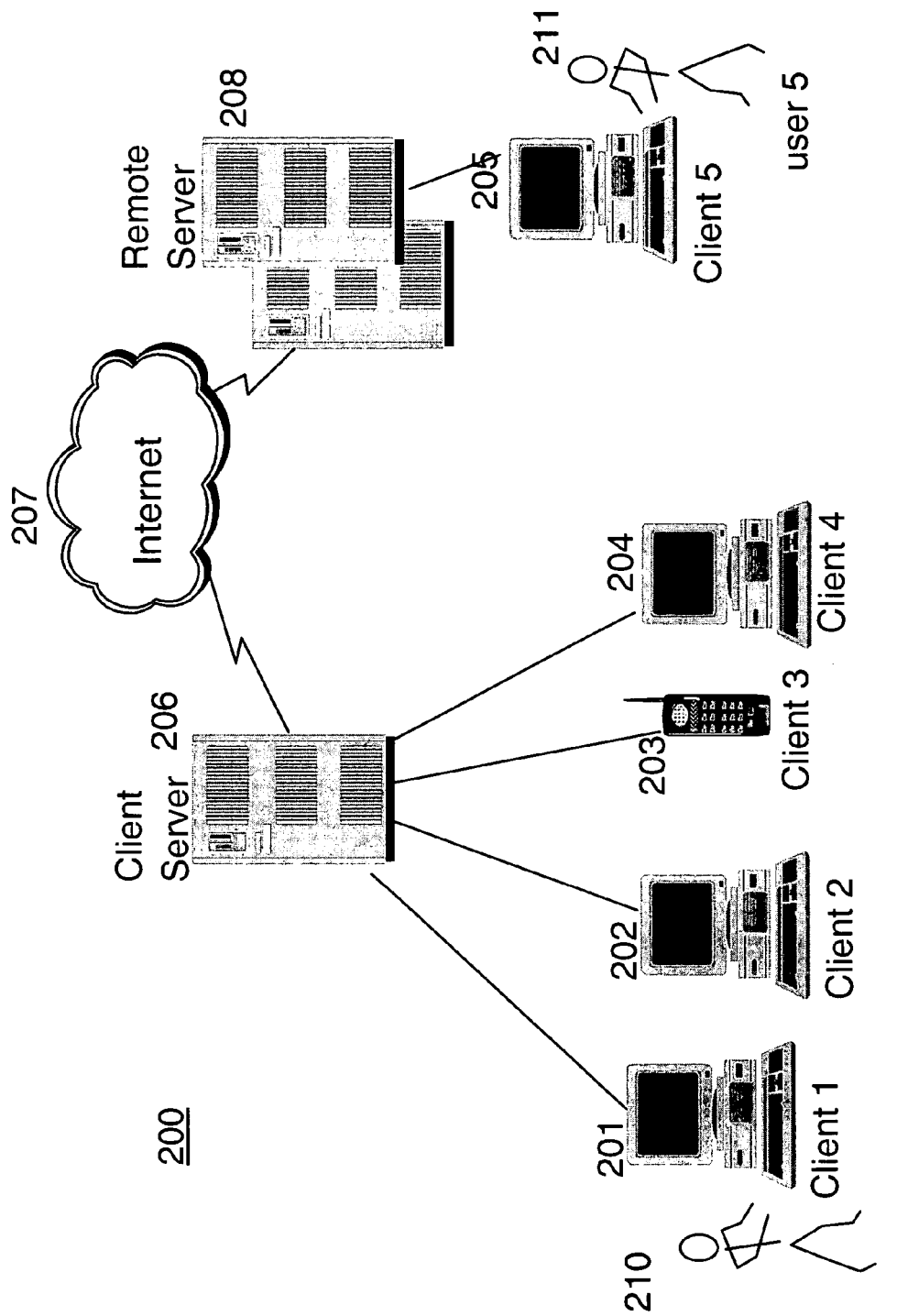
FIG. 2 is a diagram depicting a network of computer systems.

FIG. 2 illustrates a data processing network 200 in which the present invention may be practiced. The data processing network 200 may include a plurality of individual networks, such as a wireless network and a wired network, each of which may include a plurality of individual workstations 101 201 202 203 204. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository and may also be accessed directly from a workstation 205). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 201 202 203 204 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

According to Wikipedia on the world wide web at en.wikipedia.org/wiki/URL every URL is a type of Uniform Resource Identifier (URI), or more precisely the set of URLs is a proper subset of URIs. A URI identifies a particular resource while a URL both identifies a resource and indicates how to locate it. To illustrate the distinction consider the URI urn:ietf:rfc:1738 which identifies IETF RFC 1738 without indicating where to find the text of this RFC. Now consider three URLs for three separate documents containing the text of this RFC:

URL-www.ietf.org/rfc/rfc1738.txt
URL-www.w3.org/Addressing/rfc1738.txt
URL-rfc.sunsite.dk/rfc/rfc1738.txt Each URL uniquely identifies each document and thus is a URI itself, but URL syntax is such that the identity allows one to also locate each of these documents. Thus, a URL functions as the document's address. In the present specification, we refer to a Universal Resource Address (URA) to generaly represent the either URI's or URL's or any equivalent addressing term.

Historically, the terms have been almost synonymous as almost all URIs have also been URLs. For this reason, many definitions in this article mention URIs instead of URLs; the discussion applies to both URIs and URLs.

Figure 3:
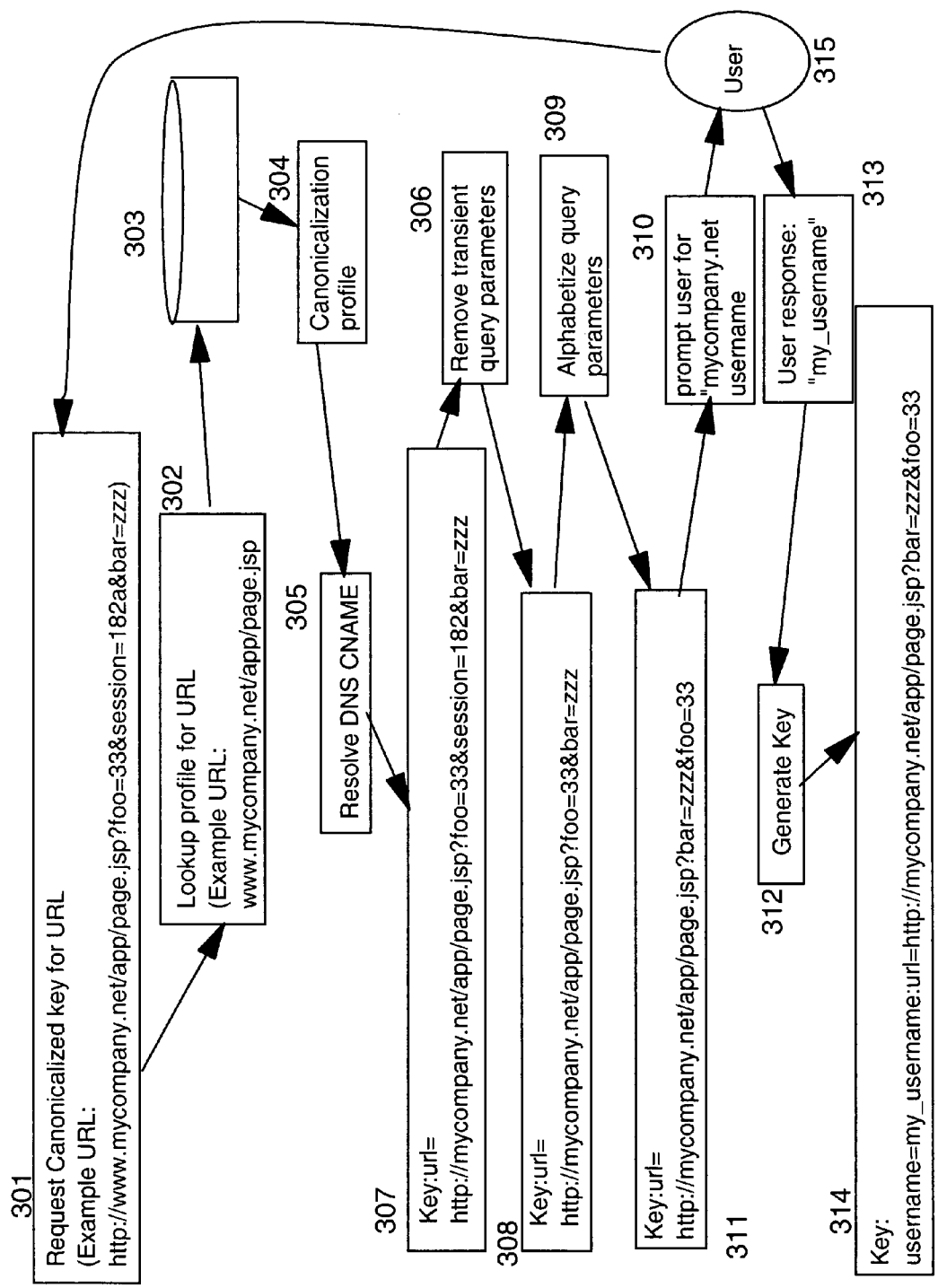
FIG. 3 depicts an example canonicalized key generated from an HTTP GET request.

FIG. 3 depicts an example implementation of the invention as it responds to a user 315 request 301 for a canonicalized key for an HTTP GET request 301. A profile 304 is located 302 in an arbitrary store 303. This figure demonstrates a profile which uses DNS CNAME resolution 305, the reordering of query parameters 309, the removal of transient query parameters 306, and the inclusion of information gathered from the user 310 313 315. All of these processes contribute 307 308 311 to the generation 312 of a canonical key 314.

Figure 4:
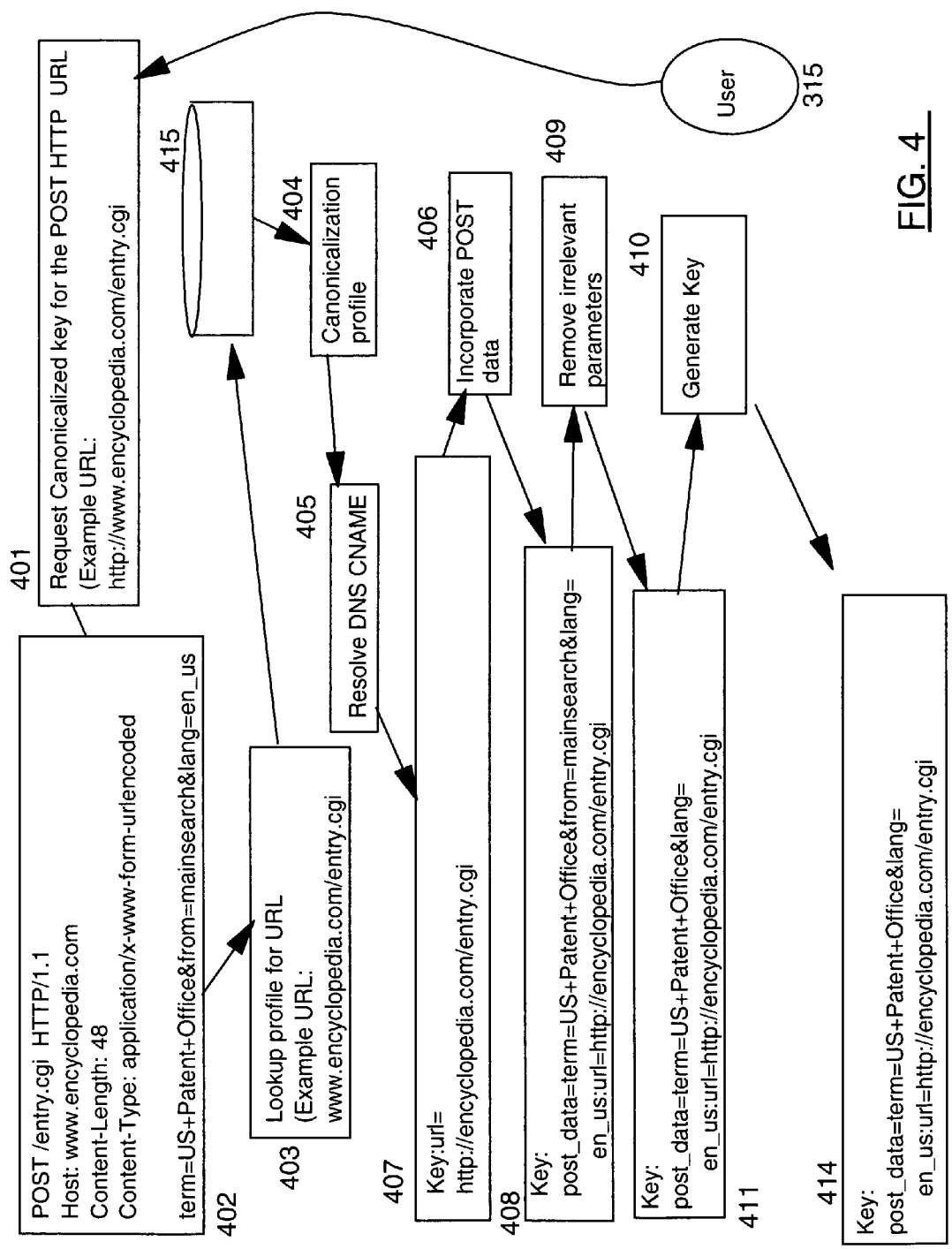
FIG. 4 depicts an example canonicalized key generated from an HTTP POST request.

FIG. 4 depicts an example implementation of the invention, as it responds to a user's 315 request 401 to generate a canonicalized key for an HTTP POST request 402. A profile 404 is located 403 in an arbitrary store 415. This figure demonstrates a profile which uses DNS CNAME resolution 405 the inclusion of selective parts of the POST data 406, and the removal of irrelevant parameters 409. All of these processes contribute 407 408 411 to the generation 410 of a canonical key 414.

Figure 5A:
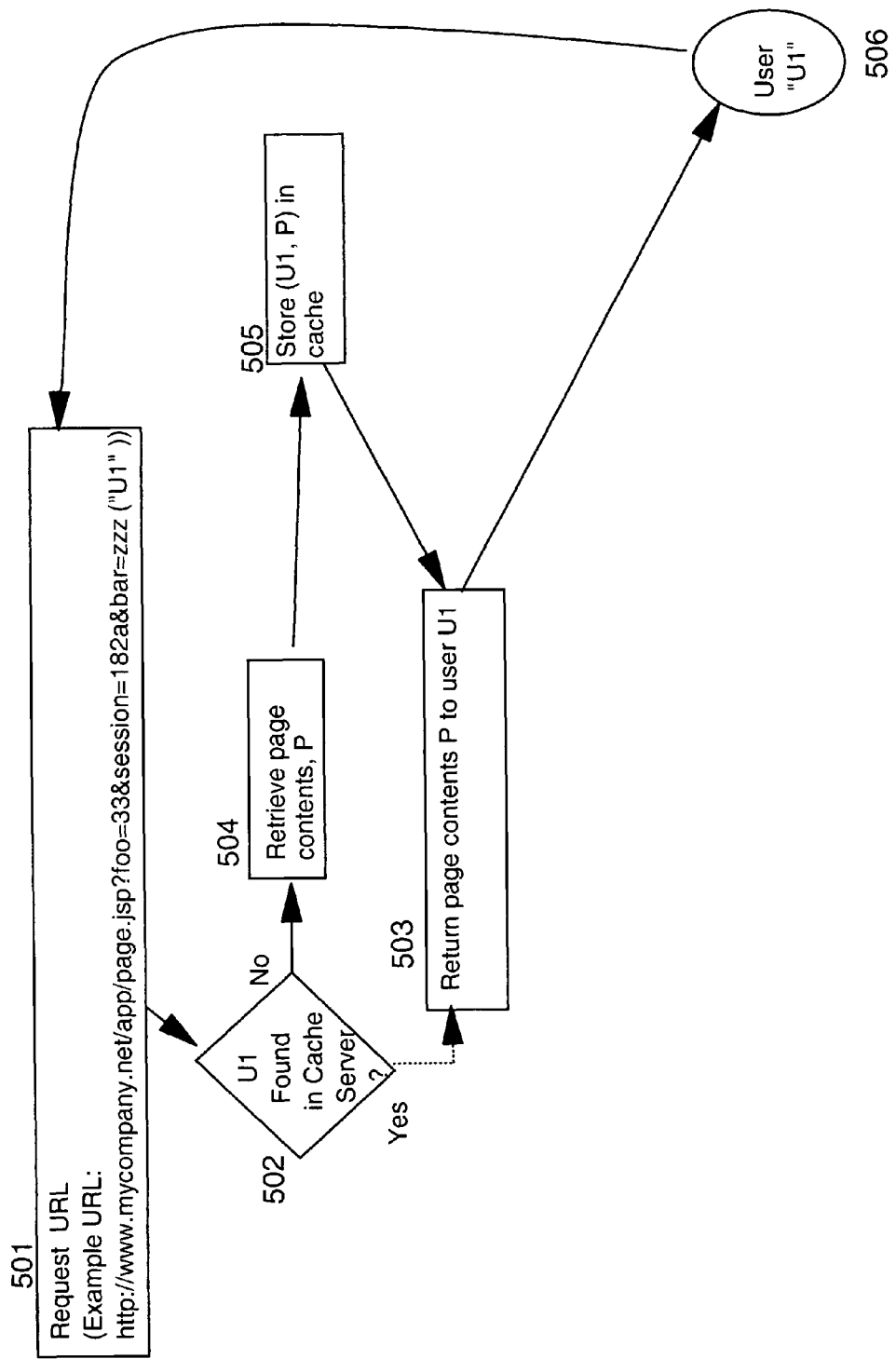
FIGS. 5A and 5B depict shortcomings of the prior art.
Figure 5B:
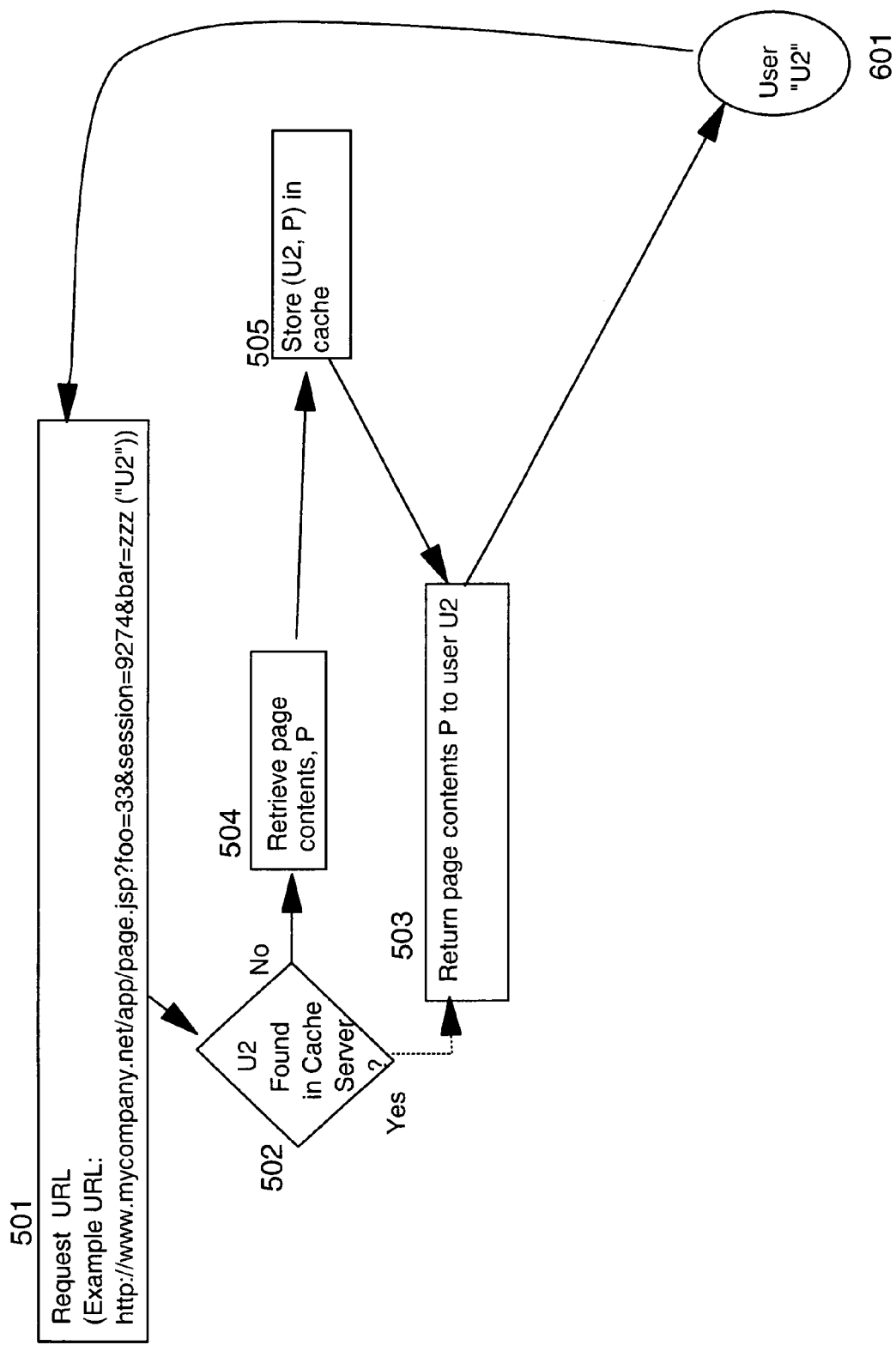

FIGS. 5A and 5B Demonstrate the shortcomings of a prior art cache server due to the multiple URLs mapping to the same web content. A user 506 makes an HTTP GET request 501 for a URL which is searched for and not found in a cache 502. The page is retrieved 504 and stored in the cache 505 before being returned to the user 503. In FIG. 5B, a different URL to the same resource is still not found in the cache 502 and so must be retrieved 504 and stored in the cache 505 once more before being returned to the user 503.

Figure 6A:
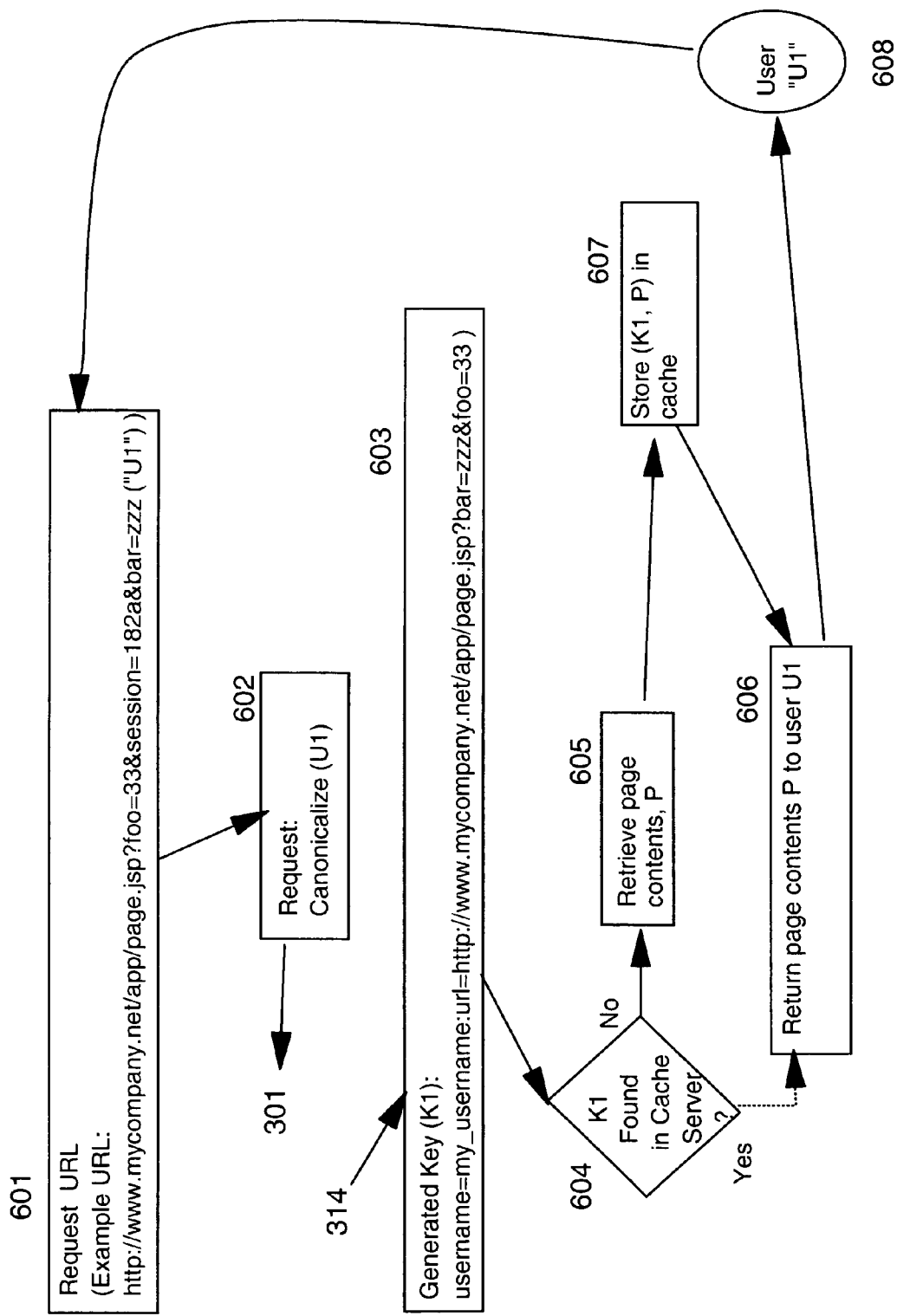
FIGS. 6A and 6B depict consistent key generation for two different URLs.
Figure 6B:
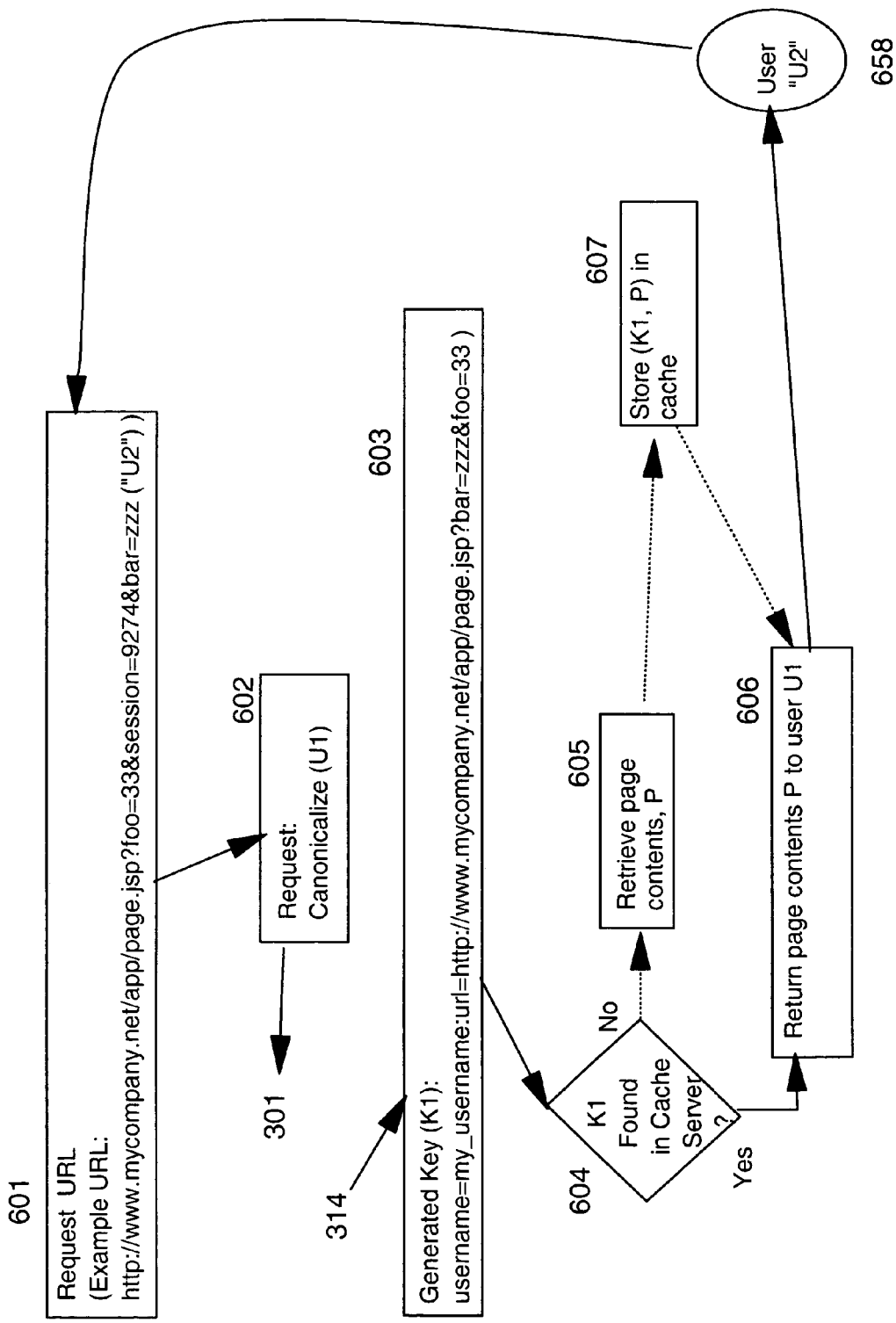

FIGS. 6A and 6B Demonstrate the use of the present invention in the scenario presented in FIGS. 5A and 5B. A user 608 makes an HTTP GET request 601 for a URL which is transformed into a canonicalized key 602 403 410. The generated key 603 is the same in both cases even though the submitted URL differs. Therefore, in the first case (FIG. 6A), the key is not found in the cache 604 which forces the cache to retrieve the page contents 605 and store it associated with the key in the cache 607 before returning the page contents to the user 606. In FIG. 6B, the other path is taken: the key is found in the cache 604 and the page contents are directly returned to the user 606. Thus, a profile generates consistent keys from disparate URLs, allowing the cache server to correctly realize when two different URL requests map to the same web page content.

Figure 7A:
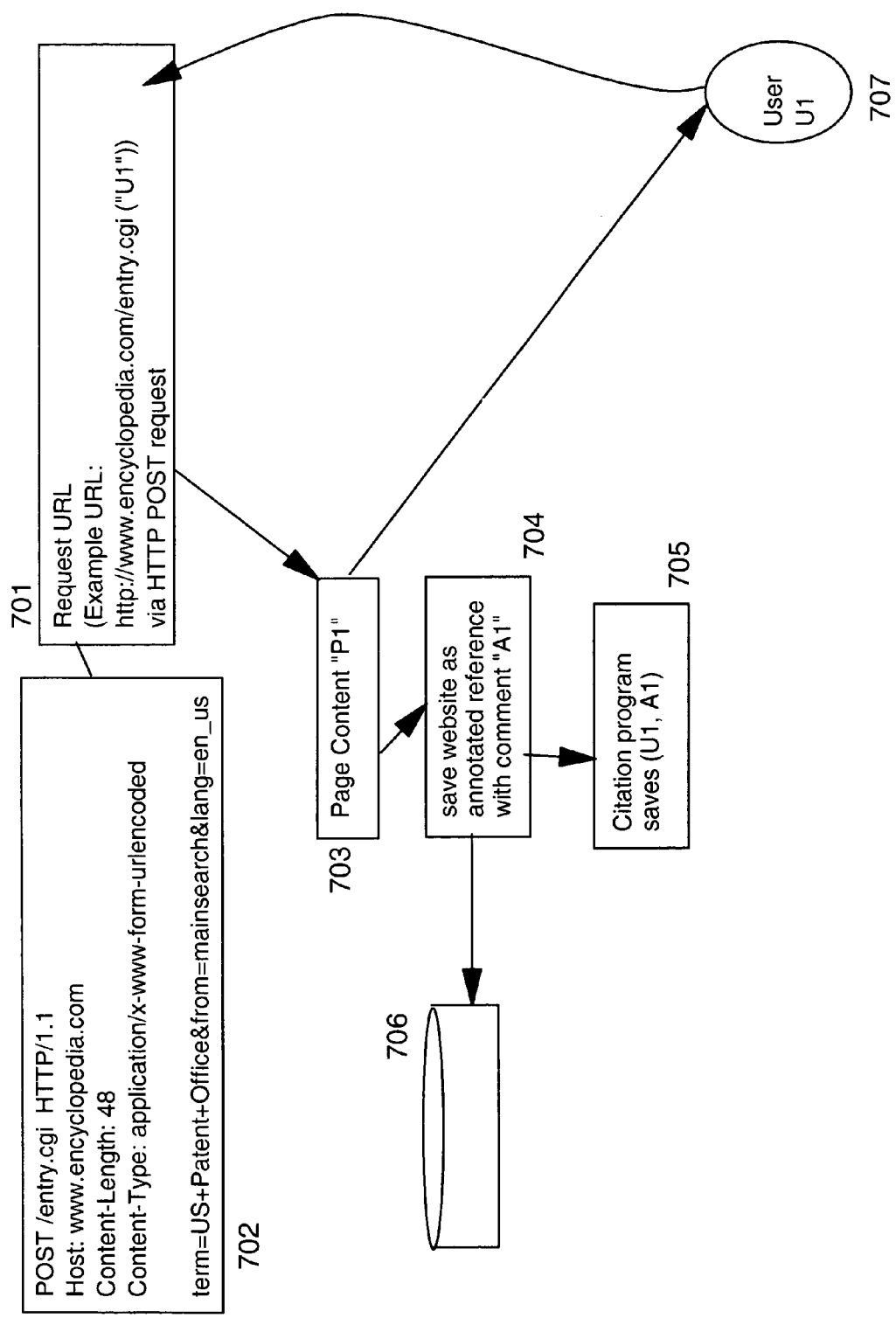
FIGS. 7A and 7B depict shortcomings of annotation citation program of prior art.
Figure 7B:
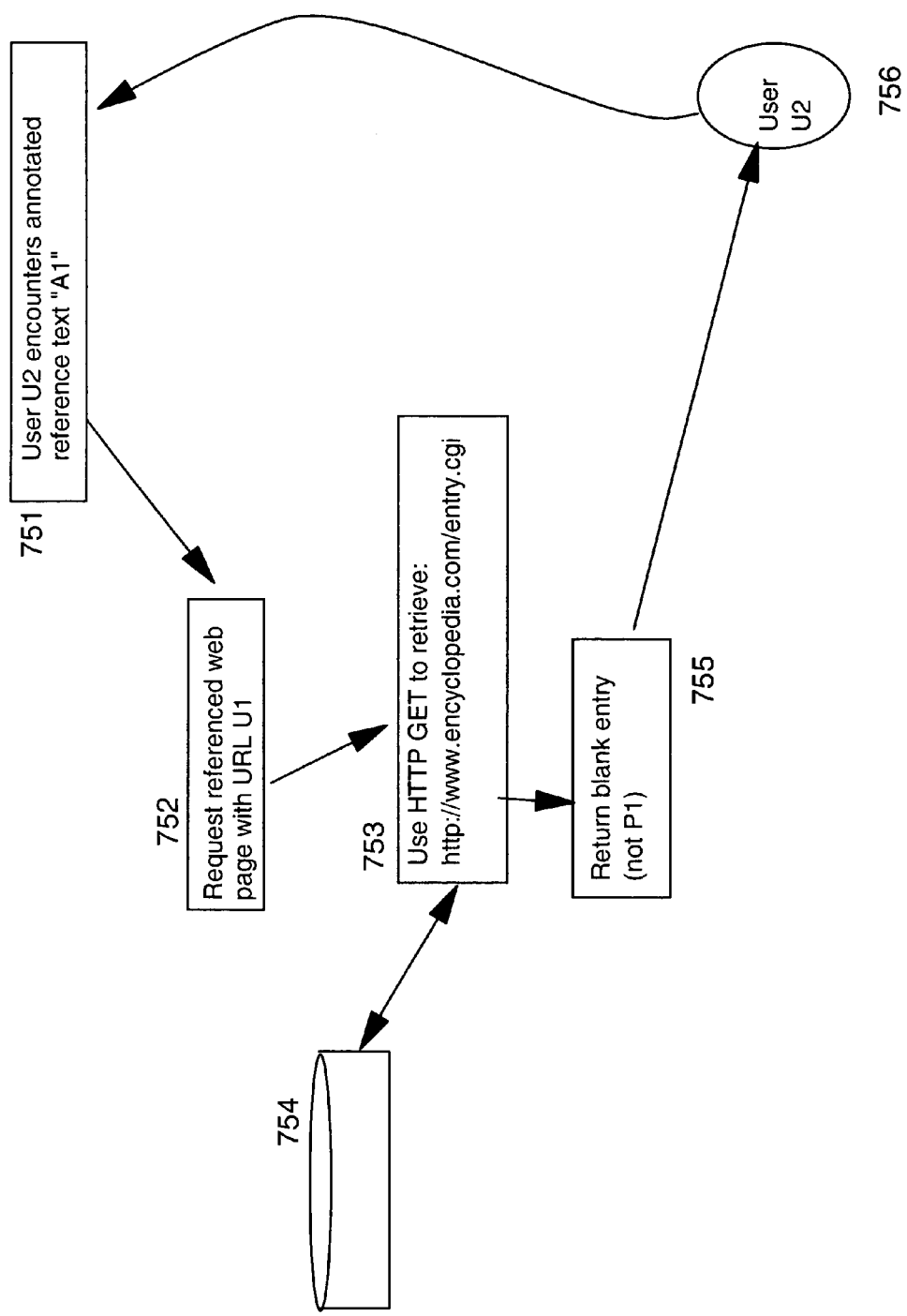

FIGS. 7A and 7B Demonstrate the shortcomings of a prior art citation program which associates annotations with web references. Because one URL may map to different web pages depending on other factors (POST data, cookies, etc.), a retrieved annotated reference may not be able to navigate the user to the original web page. In FIG. 7A, a user 707 makes an HTTP POST request 701 702 for a web resource 703. The web page returned 703 is then saved with an associated annotated comment 704 705 in an arbitrary store 706. In FIG. 7B, the user 756 locates the above referenced annotated comment 751 and asks to be seen the referenced web page 752. The prior art citation program looks up the associated URL in its store 754 and attempts to retrieve the stored URL using HTTP GET 753. The result is that a blank entry is returned to the user 755.

Figure 8A:
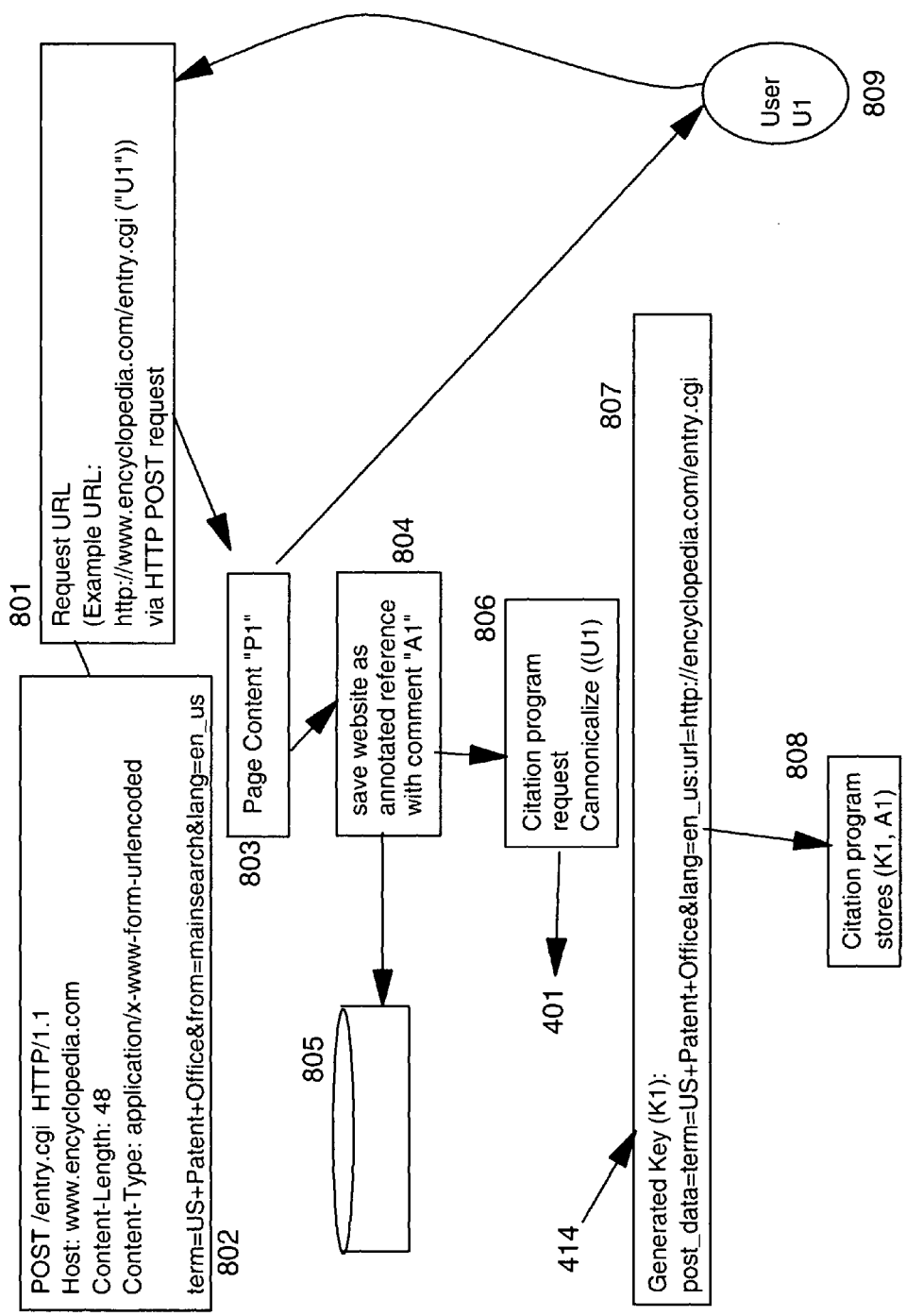
FIGS. 8A and 8B depict an example improvement for annotation citation according to the invention.
Figure 8B:
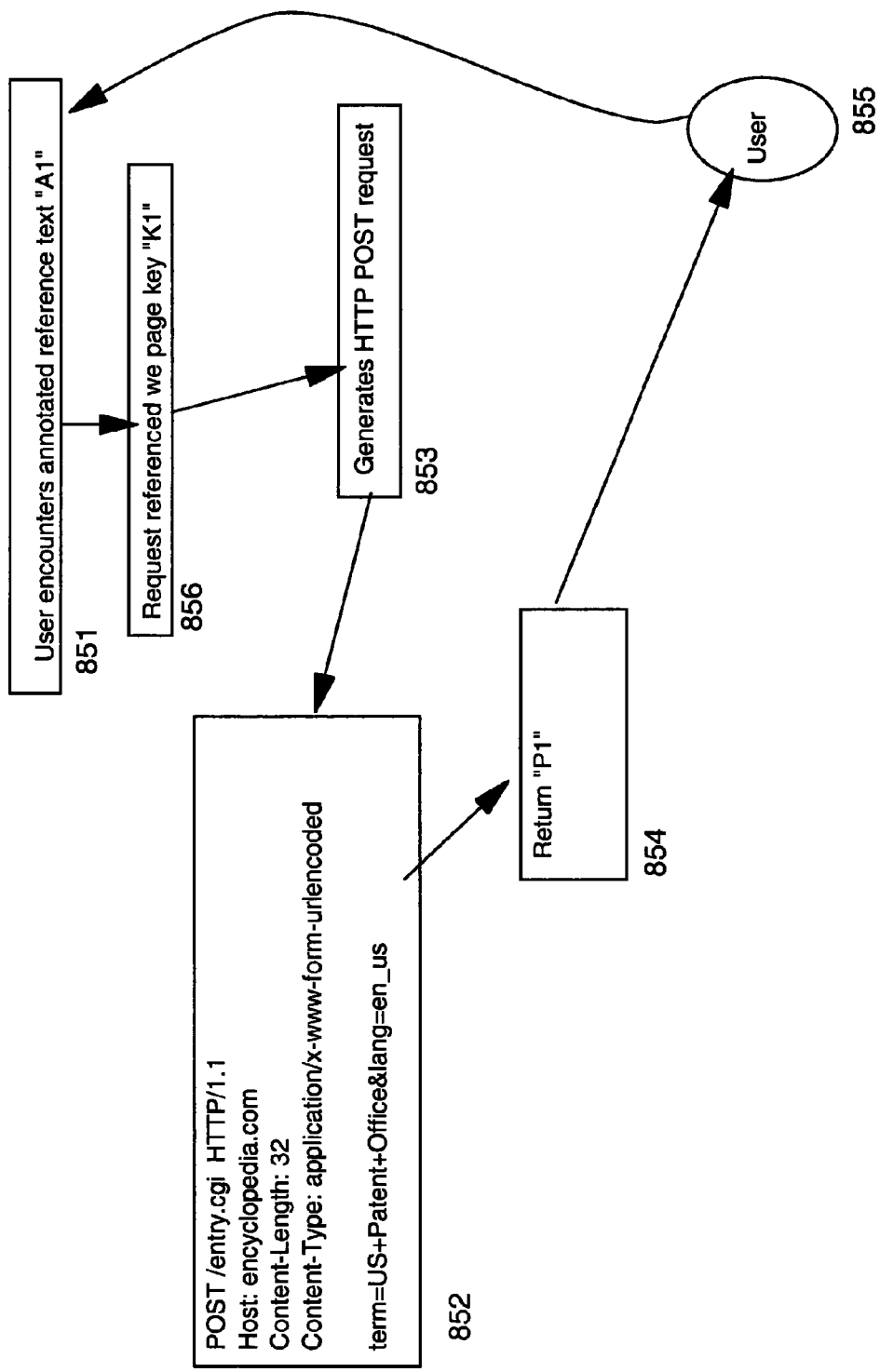

FIGS. 8A and 8B Demonstrate the use of the present invention in the scenario presented in FIGS. 7A and 7B. A profile generates a key that contains enough information beyond the URL to make the URL uniquely identify specific web page content. The citation program can use the additional information in the key to generate an HTTP request that will correctly retrieve the originally referenced web page. In FIG. 8A, A user 809 makes an HTTP POST request 801 802 and is returned an encyclopedia entry 803. A citation program using the present invention wishes to save an annotation 804 on the encyclopedia entry in its arbitrary store 805. The program requests 806 401 a canonicalized key 414 807 to represent the HTTP POST request 801 802 that returned the encyclopedia entry 803. The program stores the annotation associated with this canonicalized key 808. In FIG. 8B, a user 855 finds the above annotation 851 and wishes to see the referenced web page. The program uses the stored canonicalized key 856 to generate 853 all of the original HTTP POST request 852 which successfully retrieves the original encyclopedia entry 854 for the user.

This invention enables a software application that deals with HTTP web requests to use public policies to generate keys that uniquely identify the web page content returned by a request. An example implementation of the invention begins when an application requests a key for a particular HTTP request. The invention begins by locating a key-generation policy for the requested URL. In one embodiment of the invention, the policy is located by querying a well-known public policy repository. In an alternative embodiment, the system locates policies by querying a well-known location relative to the host machine from which the target web page is being served.

The policy that is retrieved can contain arbitrarily many transforms that the system applies to the HTTP request and URL to obtain a key. Two examples of these transformation processes are shown in FIG. 3 and FIG. 4. The transformations that are allowed include, but are not limited to:

Reordering the query parameters in a GET request's query string or in the contents of a POST request's data;

Removing query parameters from a GET request's query string or the contents of a POST request's data that do not affect the returned page. For example, a session ID may be used to identify a particular logged in instance of a user on a web site, but it is not valid as a permanent key, and instead must be replaced by authentication information (see below);

DNS CNAME (canonical name) record lookups may be used to standardize the host name of the URL;

Parameter transformations. Based on the characteristics of the particular web page, certain GET request query string parameters or POST data parameters may be transformed in an arbitrary manner. For example, if the web application that generates the content treats a certain parameter in a case-insensitive manner, then the policy would specify that the value of that parameter should be made lowercase when it is included in the key;

Including cookies or other headers sent with the request. Cookies are a standardized HTTP header popularly used to send "stateful" information from a web client to a web server; the information contained within cookies (or within other, arbitrary HTTP headers) may affect the content that is sent back by the web server. Thus, a policy may specify which HTTP headers to include as part of the key. In the case of cookies, which are named properties, the policy may specify to only include some but not all cookies that were sent to the web server.

Adding query parameters to the GET query string or POST query data. Some websites may have such dynamic content that repeating a request, even with the proper parameters included or excluded from the URL, cannot guarantee the same content. Some such sites may have a particular archival mode that can retrieve a snapshot of data as of a particular time, and a policy can specify that the appropriate parameters be added to trigger such an archival mode;

Include HTTP basic authentication information. An HTTP request for some password-protected websites contains a hashed combination of the username and password for that site. A policy can specify that this information be included in the key, such that in can be resent in future requests to re-authenticate the user; or Interactively request information from the user. Some information that is required to uniquely identify a web page's contents is not directly available as part of the URL or HTTP request. For example, a session-based authentication system may accept a username and password on one request, and then rely on a transient session ID in subsequent requests. If one of these subsequent requests requires a key to be generated, then the policy must specify that the system prompt the user for the proper username (and perhaps password, as well) to incorporate as part of the key.

The result of applying the policy should be used by applications as a key to uniquely identify a web page's content, and subsequently to retrieve that web page from the web server if need be. The use of the invention to these ends is shown in FIGS. 6A and 6B and FIGS. 8A and 8B.

Note that in one embodiment of this invention the same generic policy can be applied to all URLS, but it is an important feature of the preferred embodiment that well-known policies be publicly available and be customized to particular URLS.

FIG. 3 shows an example canonicalization of an example URL retrieved via HTTP GET.

FIG. 4 depicts an example of invention acting on a POST request.

Without profile-based URL canonicalization, applications such as web cache servers that associate content with URLs can end up with many copies of the same content and reduce the potential efficiency of the cache.

Referring to FIGS. 6A and 6B, according to an embodiment of the present invention, a profile knows to eliminate transient parts of the URL that do not affect the content of the page. Therefore, two different URLs map to the same key, and the cache is able to skip the page request the second time and use the cached version of the page. This requires less storage on the cache server and increases the efficiency of the cache.

Referring to FIGS. 7A and 7B without the present invention, applications that must store a key for a web page associated with some data to later recall that web page when viewing the data fail whenever a web page is underspecified by a URL alone.

Referring to FIGS. 8A and 8B, the profile for encyclopedia.com/entry.cgi returns the information necessary to know that POST data must be included in a key to uniquely identify the web page's contents. The profile also tells that the "from" part of the POST data is irrelevant to the content returned. By storing and later examining the profile-enhanced key, the citation program can later show the user the correct page contents to which the reference was originally made.

In a preferred embodiment, criteria for creating a key is provided by a stored user/server profile. The profile will be utilized to convert a URL for a Google search query such as:

HTTP://google.com/search?q=patent&sourceid=mozilla-search&start=0&start=0&ie=utf-8&oe=utf-8&client=firefox-a&rls=org.mozilla:en-US:official In an example, the client queries the user/server profile store for profiles matching either the "host" or "host+path" information from the user's current URL. The client receives the profile presented below:

```
1.  <?xml version="1.0" encoding="UTF-8" standalone="yes"?>
2.  <Profile
        xmlns="HTTP://www.ibm.com/schemata/urlcanonicalization"
        id="urn:lsid:ibm.com:uc-profiles:google-search">
3.      <base>HTTP://google.com/search</base>
4.      <name>Google Search</name>
5.      <description>A URL Canonicalization profile for Google
        Search</description>
6.      <apply>
7.      <resolve-dns-cname-true</resolve-dns-cname>
8.      <include> http-param name="q" />
9.      <include>http-param name="ie">
10.       <lowercase>yes<lowercase>
11.     </include-http-param>
12.     <include-http-param name="oe">
13.       <lowercase>yes<lowercase>
14.     </include-http-param>
15.     <include-http-param name="num" />
16.     <include-http-param name="start" remove-duplicates="yes" />
17.     <sort-http-params direction="ascending"
          collation="codepoint"/>
18.     <include-http-header name="Cookie" /-
19.     </apply-
20.   </Profile-
```

The "profile:id" attribute is used to universally distinguish this profile from any other profile that processes this web application. The "base" element matches a portion of the client's URL with extra information for processing the URL. The "name" and "description" elements are just for user interface display. The "apply" element contains other elements that define a transformation in the process of canonicalizing this URL. In the example provided, it only shows elements under our inventions' fictitious XML namespace, but one could expect this process to be easily extended through the use of third-party XML namespaces. The first transformation called in this profile is to resolve the DNS CNAME for the host which would turn "google.com" into "www.google.com". After "resolve-dns-cname", there are a series of "include-http-param" elements that indicate only the HTTP params that we would like to keep in the process. There are some extra processing instructions available within the "include-http-param" such as lower casing the value of the parameter or removing duplicate parameters that a client might have included by mistake. Next, we have a "sort-http-params" transformation which will re-arrange the HTTP params in ascending order using UNICODE codepoint collation methods. Additionally, the transformation process will include a piece of information not found in the URL itself, such as the "Cookie" HTTP header sent to the server when requesting this URL.

After successfully processing all transformation elements inside the "apply" element, the new canonicalized URL would be:

www.google.com/search?ie=utf-8&oe=utf-8&q=patent&start=0

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer implemented method for generating canonicalized keys, the method comprising:

receiving by the computer, a request from a requestor for a canonicalized key, the request comprising a first uniform resource address (URA) for locating a corresponding web page, the first URA comprising an authority and a query string of query parameters, the first URA consisting of any one of a uniform resource identifier (URI) or a uniform resource locator (URL);

obtaining by the computer, a key generating policy for generating the canonicalized key;

transforming the query string by the computer to produce a transformed query string based on said obtained key generating policy, wherein the transforming consists of reordering the query parameters, removing query parameters or adding query parameters; and generating by the computer, the canonicalized key based on the transformed query string, wherein the generated canonicalized key comprises a second URA comprising the authority and the transformed query string.

2. The method according to claim 1, wherein the obtained key generating policy causes the creating the transformed query string step to perform one or more steps consisting of any one of:

selectively positioning one or more of said query parameters of the first URA in the second URA, selectively not including one or more query parameters of the first URA in the second URA, including an HTTP header in the canonicalized key, selectively adding one or more additional query parameters to the second URA, wherein the one or more additional query parameters consist of query parameters not included in the first URA, selectively including POST query data in the canonicalized key, selectively including HTTP basic authentication information in the canonicalized key, and prompting a user for the additional information for generating the canonicalized key.

3. The method according to claim 1, further comprising:
associating the canonicalized key with external data; and
using the canonicalized key to obtain external data to provide to the requestor a version of the web document as it existed when the canonicalized key was associated with the external data.

4. The method according to claim 1, wherein the key generating policy comprises any one of a policy related to a user or a policy provided by a web service.

5. The method according to claim 1, wherein the first query string comprises first parameters absent in the second URA.

6. The method according to claim 1, further comprising using the canonicalized key to search a cache for the corresponding web page.

7. The method according to claim 6, further comprising:
responsive to determining the generated canonical key is not in the cache performing a) though c);
a) retrieving the web page associated with the first URA,
b) associating the generated canonicalized key with the retrieved web page; and
c) saving the retrieved web page and associated generated canonicalized key in the cache; and
responsive to determining the generated canonicalized key is in the cache, retrieving the web page associated with the canonicalized key from the cache.

8. A computer program product for generating canonicalized keys, the computer program product comprising:
receiving by the computer, a request from a requestor for a canonicalized key, the request comprising a first uniform resource address (URA) for locating a corresponding web page, the first URA comprising an authority and a query string of query parameters, the first URA consisting of any one of a uniform resource identifier (URI) or a uniform resource locator (URL);

obtaining by the computer, a key generating policy for generating the canonicalized key;

transforming the query string by the computer to produce a transformed query string based on said obtained key generating policy, wherein the transforming consists of reordering the query parameters, removing query parameters or adding query parameters; and generating by the computer, the canonicalized key based on the transformed query string, wherein the generated canonicalized key comprises a second URA comprising the authority and the transformed query string comprising the first authority and the second query string.

9. The computer program product according to claim 8, wherein the obtained key generating policy causes the creating the transformed query string step to perform one or more steps consisting of any one of:

selectively positioning one or more of said query parameters of the first URA in the second URA, selectively not including one or more query parameters of the first URA in the second URA, including an HTTP header in the canonicalized key, selectively adding one or more additional query parameters to the second URA, wherein the one or more additional query parameters consist of query parameters not included in the first URA, selectively including POST query data in the canonicalized key, selectively including HTTP basic authentication information in the canonicalized key, and prompting a user for the additional information for generating the canonicalized key.

10. The computer program product according to claim 8, wherein the first query string comprises first parameters absent in the second URA.

11. The computer program product according to claim 8, further comprising using the canonicalized key to search a cache for the corresponding web page.

12. The computer program product according to claim 11, further comprising:
responsive to determining the generated canonical key is not in the cache performing a) though c);
a) retrieving the web page associated with the first URA,
b) associating the generated canonicalized key with the retrieved web page; and
c) saving the retrieved web page and associated generated canonicalized key in the cache; and
responsive to determining the generated canonicalized key is in the cache, retrieving the web page associated with the canonicalized key from the cache.

13. A system for generating canonicalized keys, the system comprising:
a network;
a server system in communication with the network
a client system in communication with the server system wherein the system includes instructions to execute a method comprising the steps of:
receiving by the computer, a request from a requestor for a canonicalized key, the request comprising a first uniform resource address (URA) for locating a corresponding web page, the first URA comprising an authority and a query string of query parameters, the first URA consisting of any one of a uniform resource identifier (URI) or a uniform resource locator (URL);

obtaining by the computer, a key generating policy for generating the canonicalized key;

transforming the query string by the computer to produce a transformed query string based on said obtained key generating policy, wherein the transforming consists of reordering the query parameters, removing query parameters or adding query parameters; and generating by the computer, the canonicalized key based on the transformed query string, wherein the generated canonicalized key comprises a second URA comprising the authority and the transformed query string.

14. The system according to claim 13, wherein the obtained key generating policy causes the creating the transformed query string step to perform one or more steps consisting of any one of:

selectively positioning one or more of said query parameters of the first URA in the second URA, selectively not including one or more query parameters of the first URA in the second URA, including an HTTP header in the canonicalized key, selectively adding one or more additional query parameters to the second URA, wherein the one or more additional query parameters consist of query parameters not included in the first URA, selectively including POST query data in the canonicalized key, selectively including HTTP basic authentication information in the canonicalized key, and prompting a user for the additional information for generating the canonicalized key.

15. The method according to claim 13, wherein the first query string comprises first parameters absent in the second URA.

16. The system according to claim 13, further comprising using the canonicalized key to search a cache for the corresponding web page.

17. The system according to claim 16, further comprising the further steps of:

responsive to determining the generated canonical key is not in the cache performing a) though c);

a) retrieving the web page associated with the first URA, b) associating the generated canonicalized key with the retrieved web page; and c) saving the retrieved web page and associated generated canonicalized key in the cache; and responsive to determining the generated canonicalized key is in the cache, retrieving the web page associated with the canonicalized key from the cache.

18. The system according to claim 13, further comprising:

associating the canonicalized key with external data; and using the canonicalized key to obtain external data to provide to the requestor a version of the web document as it existed when the canonicalized key was associated with the external data.

* * * * *